United States Patent
Wong et al.

(10) Patent No.: US 7,068,496 B2
(45) Date of Patent: Jun. 27, 2006

(54) DOCKING SOLUTION FOR A TABLET NOTEBOOK COMPUTER

(75) Inventors: Hong W. Wong, Portland, OR (US); Truong V. Phan, Hillsboro, OR (US); Prosenjit Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/838,845

(22) Filed: May 3, 2004

(65) Prior Publication Data

US 2005/0243504 A1 Nov. 3, 2005

(51) Int. Cl.
*H05K 7/16* (2006.01)
(52) U.S. Cl. ............... 361/681; 248/921; 248/922; 248/923; 16/223; 307/116; 307/119; 307/125
(58) Field of Classification Search ............... 307/112, 307/116, 119, 125, 134, 139, 149, 154; 312/223.1; 345/173, 905, 169; 710/303; 16/223; 439/65, 439/67, 188; 361/681; 248/917, 921–923
See application file for complete search history.

(56) References Cited

U.S. PATENT DOCUMENTS

| | | | | |
|---|---|---|---|---|
| 5,085,394 A | * | 2/1992 | Torii | 248/455 |
| 5,258,655 A | * | 11/1993 | May et al. | 307/139 |
| 5,548,478 A | * | 8/1996 | Kumar et al. | 361/681 |
| 5,612,520 A | * | 3/1997 | Toedtman et al. | 200/16 D |
| 5,619,397 A | * | 4/1997 | Honda et al. | 361/686 |
| 6,044,473 A | * | 3/2000 | Kim | 713/320 |
| 6,700,773 B1 | * | 3/2004 | Adriaansen et al. | 361/680 |
| 2004/0212954 A1 | * | 10/2004 | Ulla et al. | 361/680 |
| 2004/0246668 A1 | * | 12/2004 | Maskatia et al. | 361/683 |
| 2005/0041381 A1 | * | 2/2005 | Maskatia et al. | 361/683 |

* cited by examiner

*Primary Examiner*—Anatoly Vortman
*Assistant Examiner*—Zachary M. Pape
(74) *Attorney, Agent, or Firm*—Blakely, Sokoloff, Taylor & Zafman LLP

(57) ABSTRACT

A docking solution for a tablet notebook computer is described. Specifically, the docking solution provides a way to adjust the tilt angle of the tablet screen while conserving area. Further, a main connector and an auxiliary connector is provided to provide an electrical contact between the base unit and the tablet screen when the tablet notebook computer is in a convertible mode.

10 Claims, 6 Drawing Sheets

DOCKING SOLUTION FOR A TABLET NOTEBOOK COMPUTER

FIELD OF THE INVENTION

The present invention pertains to the field of computer system design. More particularly, the present invention relates to a docking solution for a notebook computer having a tablet screen that may be removed from the base unit, laid flat on the base unit, or tilted on the base unit.

BACKGROUND OF THE INVENTION

FIG. 1 depicts a traditional computer system. A traditional notebook computer comprises a base unit 110, a keyboard 120, and a display 130. The processor is typically part of the base unit 110. The keyboard 120 is coupled to the base unit 110 and provides a user interface with the processor. The display 130 is generally coupled to the edge of a base unit 110 via a hinge.

A tablet notebook computer is a mobile personal computer that has a tablet screen instead of a traditional display. The tablet notebook computer also comprises a base unit a keyboard. In a tablet computer, the processor may be part of the tablet screen. In addition to the keyboard, the tablet notebook computer provides an user interface with the processor through the tablet screen. The user may enter text directly on the tablet screen using a digital pen, plastic pen, or fingers. The tablet screen is typically coupled to the edge of the base unit with a hinge.

The tablet screen is also typically capable of being laid flat on the base to allow the user to write on the tablet screen with a digital pen in a manner similar to the using a pen and paper.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

A tablet notebook computer may have three operating positions. The first position permits a user to remove or detach the tablet screen from the base unit. This is the detachable mode. The second position allows the tablet screen to be laid flat on the base unit. This is the convertible mode. Finally, the third position allows the tablet screen to be tilted at an angle. This is the tilt mode. The tablet screen is electrically coupled to the base unit in the convertible and tilt modes.

While a tablet notebook computer may offer a user the ability to detach the tablet screen or to lay the tablet screen flat on the base unit, the tablet notebook computer still takes up a similar amount of space as a traditional notebook computer when the tablet screen is connected to the base unit through a hinge and tilted backwards. Space is a concern in certain working environments. For example, the amount of working space is limited on a commercial airplane flight. The working space on a flight is further constrained when a passenger in the preceding seat places his/her seat in a reclining position.

Figure 1:
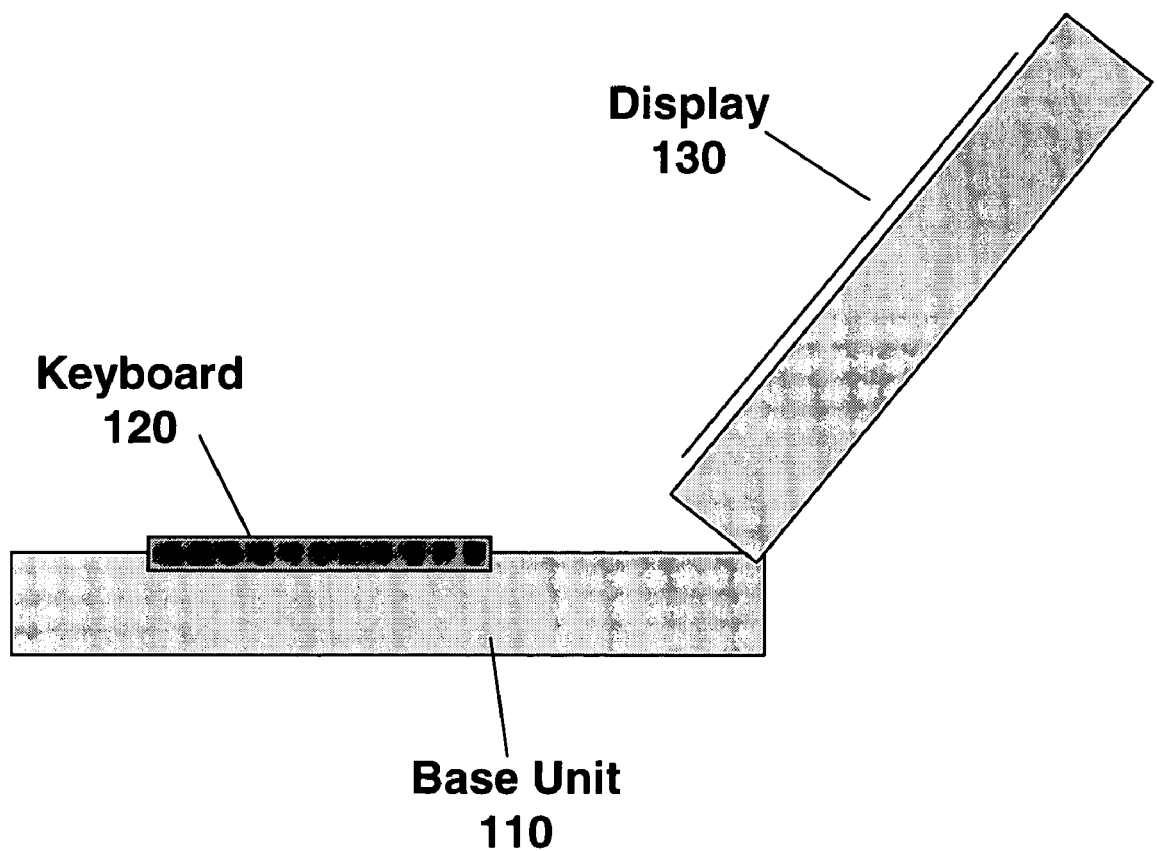
FIG. 1 is a prior art embodiment of a notebook computer system.
Figure 2:
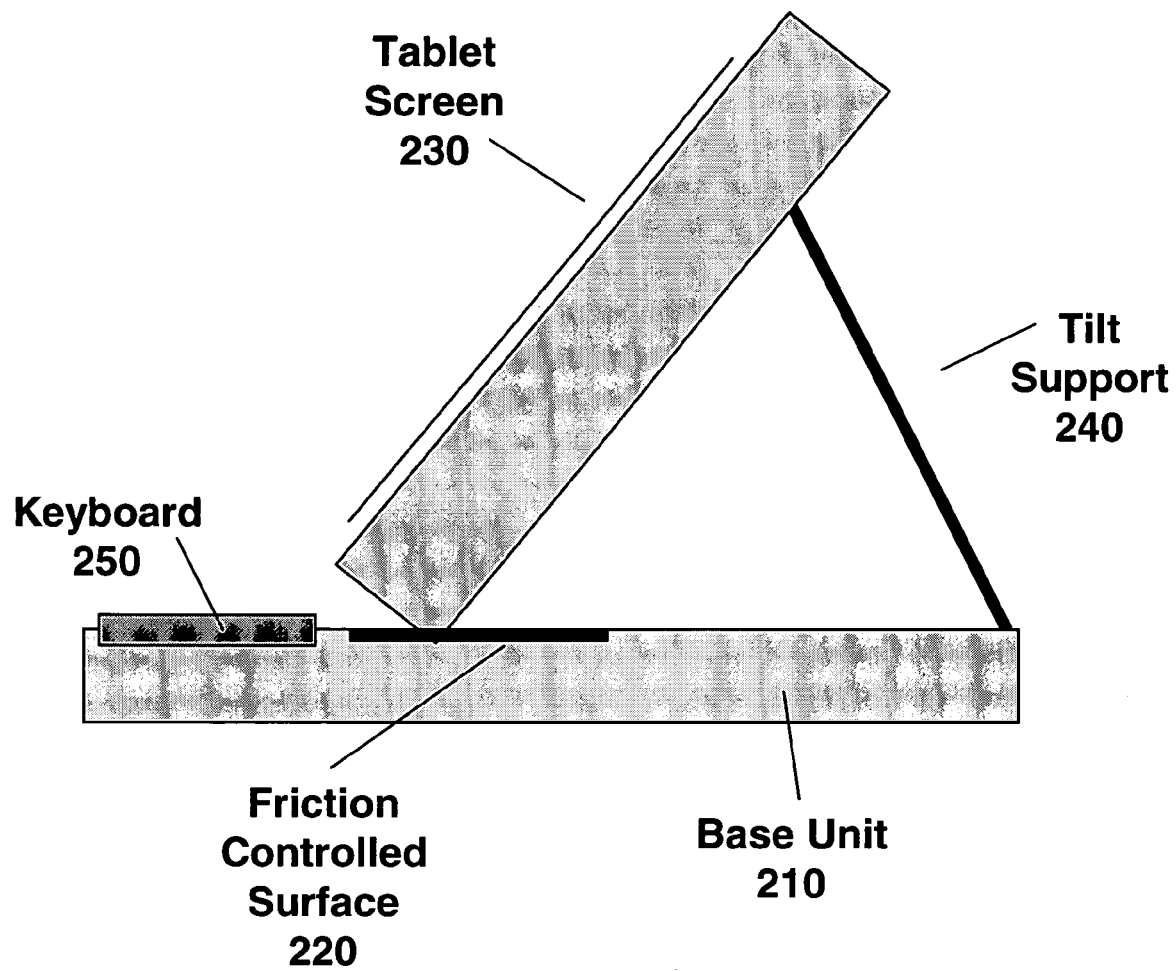
FIG. 2 is an embodiment of a side view of a tablet notebook computer that allows for tilting of the tablet screen.

FIG. 2 depicts an embodiment of a tablet notebook computer that reduces the space requirement of a tablet notebook computer in the tilt mode. The tablet notebook computer of FIG. 2 comprises a base unit 210, a friction controlled surface 220, a tablet screen 230, a tilt support 240, a keyboard 250. The base unit 210 is coupled to the friction controlled surface 220, the keyboard 250, and the tilt support 240. The tablet screen is coupled to the friction controlled surface 220 and the tilt support 240.

The base unit 210 comprises a printed circuit board (PCB). The PCB is electrically coupled to the tablet screen 230 by a docking connector and a cable. The docking connector attaches the tilt screen 230 to the base unit 210. The friction controlled surface 320 is part of the docking connector assembly and defines the angle that the tablet screen 230 is tilted in the tilt mode. The docking connector will be described in further detail below.

The tilt support 240 provides support for the tablet screen 230 when the tablet screen 230 is in the tilt mode. There are no electrical wires or circuits running through the tilt support 240, which simplifies the design. A user may enter data into the tablet notebook computer using the keyboard 250. The keyboard 250 may be the same size or more compact than a keyboard of a traditional notebook computer. The user may also enter data directly through the tablet screen.

Figure 3:
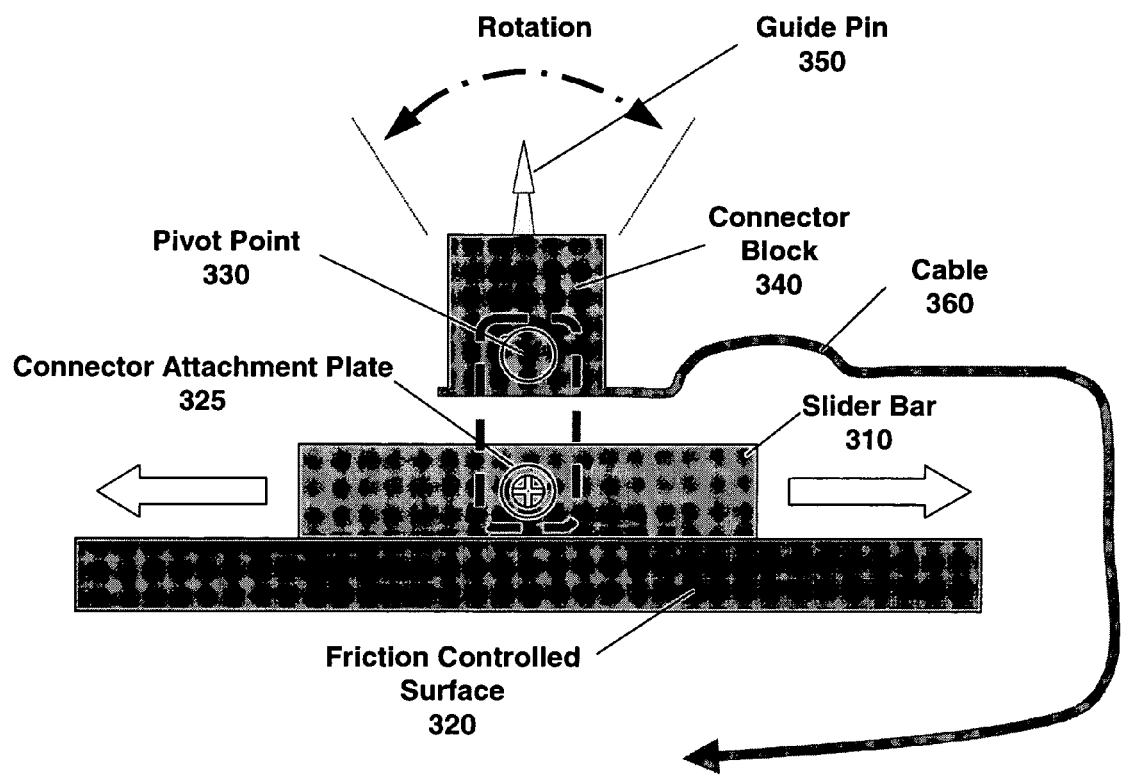
FIG. 3 is an embodiment of a tablet notebook computer having a docking connector having a base unit that allows the tablet screen to slide along the Y-axis to provide an optimal display viewing angle.

FIG. 3 depicts an embodiment of a docking connector. The docking connector allows the tablet screen to slide along the Y-axis to provide an optimal display viewing angle for the user. The docking connector of FIG. 3 comprises a slider bar 310, a friction controlled surface 320, a connector attachment plate 325, a pivot point 330, a connector block 340, a guide pin 350, and a cable 360. The slider bar 310 is coupled to the friction controlled surface 320 and the connector attachment plate 325. The connector attachment plate 325 is coupled to the pivot point 330. The pivot point 330 is coupled to the connector block 340. The connector block is coupled to the cable 360 and the guide pin 350.

The slider bar 310 slides along the path defined by the friction controlled surface 320. For this embodiment of the invention, the slider bar 310 is located above the friction controlled surface 320 and the base unit. The connector attachment plate 325 couples the slider bar 310 to the connector block 340. The connector block 340 is also coupled to the cable 360. The cable 360 is coupled to the PCB in the base unit. The cable 360 may be a flexible printed circuit cable, a coax cable, a ribbon cable, or some other cable that provides an electrical interface between the tablet screen and the base unit. The connector block 340 comprises circuits that electrically couple signals from the cable 360 to the connector block 340 and the guide pin 350.

The guide pin 350 couples the tablet screen to the connector block 340. The guide pin 350 may be retractable and supplies signals to the tablet screen from the cable 360. The docking connector may comprise more than one guide pin to provide an electrical contact between the base unit and the tablet screen, and to attach the base unit to the tablet screen. The connector block 340 may be mounted on a swivel bracket to allow the connector block 340 to rotate freely along the X-axis. The swivel bracket may also slide along the Z-axis. This enables the tablet screen to tilt back and forth and to provide the user with the optimal viewing angle. The pivot point 330 coupled to the connector block 340 allows the connector block 340 to rotate when the angle of the tablet screen is adjusted in tilt mode. The tablet screen may be removed from the guide pin 350 if the user wishes to operate the tablet notebook computer in the convertible mode or the tablet mode.

Figure 4:
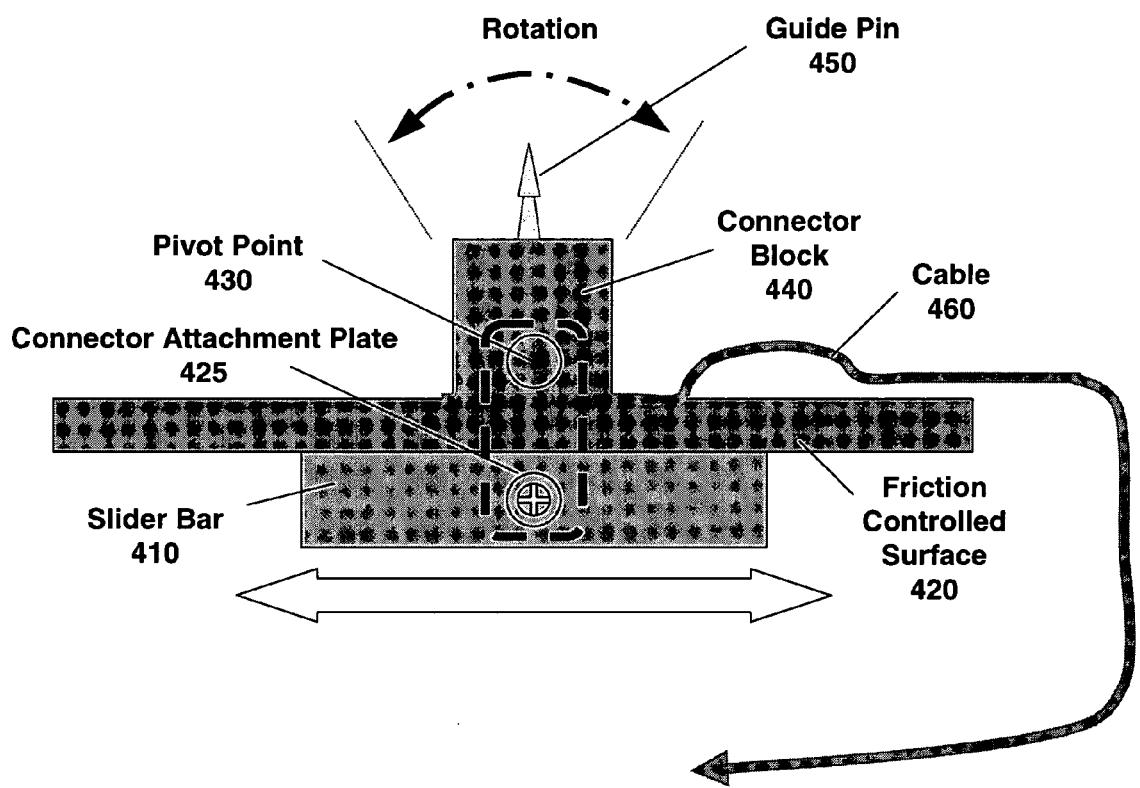
FIG. 4 is another embodiment of a side view of a tablet notebook computer having a base unit docking connect assembly that allows for tilting of the tablet screen.

FIG. 4 depicts another embodiment of a docking connector for coupling a tablet screen to a base unit. The docking connector of FIG. 4 comprises a slider bar 410, a friction controlled surface 420, a connector attachment plate 425, a pivot point 430, a connector block 440, a guide pin 450, and a cable 460. The connector attachment plate 425 is coupled to the slider bar 410 and the pivot point 430. The pivot point 430 is coupled to the connector block 440. The connector block 440 is coupled to the cable 460 and the guide pin 450.

For this embodiment of the invention, the slider bar 410 is coupled below the frictional controlled surface 420 and the base unit. The range of the motion of the slider bar 410 is defined by the friction controlled surface 420. The slider bar 410 is coupled to the connector block 440 by the connector attachment plate 425. The tablet screen is coupled to the connector block 440 via the guide pin 450. The guide pin 450 may be retractable. In the tilt mode, the angle of the tablet screen may be adjusted by rotating the tablet screen about the guide pin 450. The slider bar 410 may be moved along the friction controlled surface 420 to adjust the tilt angle. The pivot point 430 provides mobility to the connector block 440 when the slider bar 410 is moved.

The cable 460 provides electrical signals between the PCB and the connector block 440. The cable 460 may be a flexible printed circuit cable, coax cable, or ribbon cable. Circuits in the connector block 440 electrically couple the signals from the cable 460 to the guide pin 450. The guide pin 450 and/or the connector block 440 then supplies the signals to the tablet screen.

Figure 5:
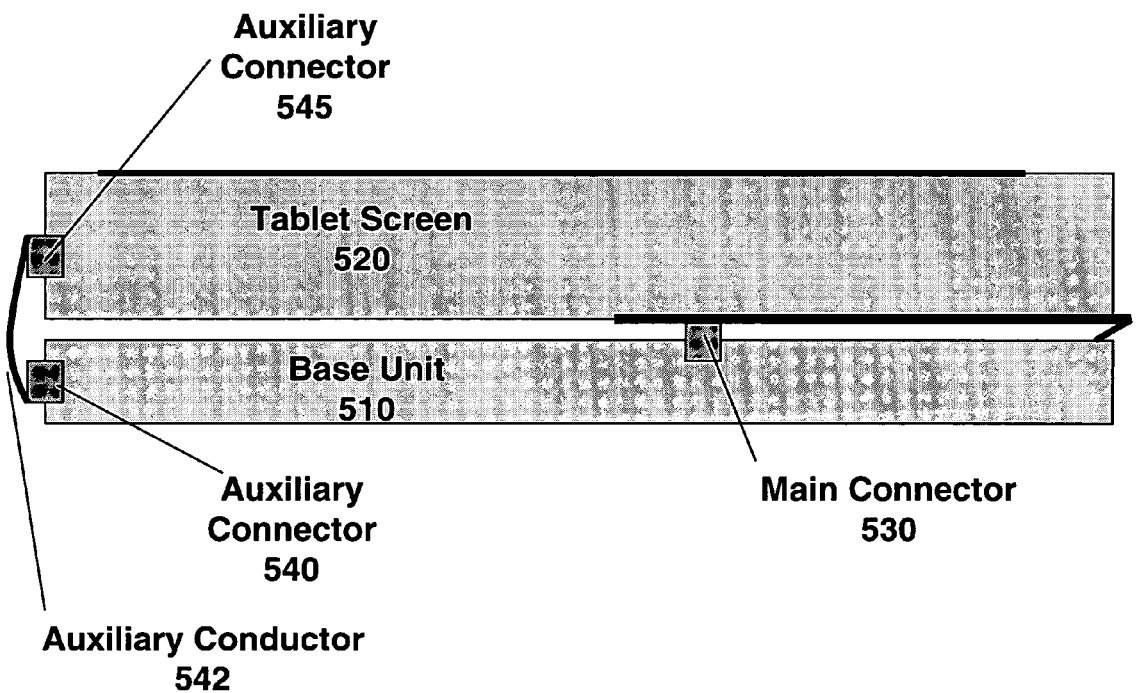
FIG. 5 is an embodiment of a tablet notebook computer having two possible electrical connections between the tablet screen and the base unit.

In the tilt mode, the connector block 340 of FIG. 3 and the connector block 440 of FIG. 4 provide an electrical contact between the tablet screen and the base unit. For one embodiment of the invention, the tablet notebook computer of FIG. 5 comprises two electrical contacts between a tablet screen and a base unit to accommodate a tablet notebook system having a tilt mode and a convertible mode. The tablet notebook computer of FIG. 5 comprises a base unit 510, a tablet screen 520, a main connector 530, an auxiliary connector 540, an auxiliary conductor 542, and an auxiliary connector 545.

In the convertible mode, the main connector 530 is not used. The auxiliary connectors 540 and 545, and auxiliary conductor 542 are used to connect the tablet screen 520 and the base unit 510. The auxiliary connector 540 is coupled to the auxiliary conductor 542. The auxiliary conductor 542 is coupled to auxiliary connector 545 and the tablet screen 520.

The main connector 530 provides an electrical contact between the base unit 510 and tablet screen 520 in the tilt mode. The main connector 530 may be the connector block 340 or the connector block 440. When the tablet notebook computer is placed in the convertible mode, the auxiliary connector 540 provides an electrical contact between the base unit 510 and the tablet screen 520 through the auxiliary conductor 542 and auxiliary connector 545. The auxiliary connector 540, the auxiliary conductor 542 and the auxiliary connector 545 also serve to hold the base unit and the tablet screen together when the notebook computer is in the convertible mode. If the user chooses to switch to the tablet mode or the tilt mode from the convertible mode, the auxiliary connector 545 may be detached from the tablet screen 520. The auxiliary connector 545 is attached to the tablet screen 520 in all the usage modes.

Figure 6:
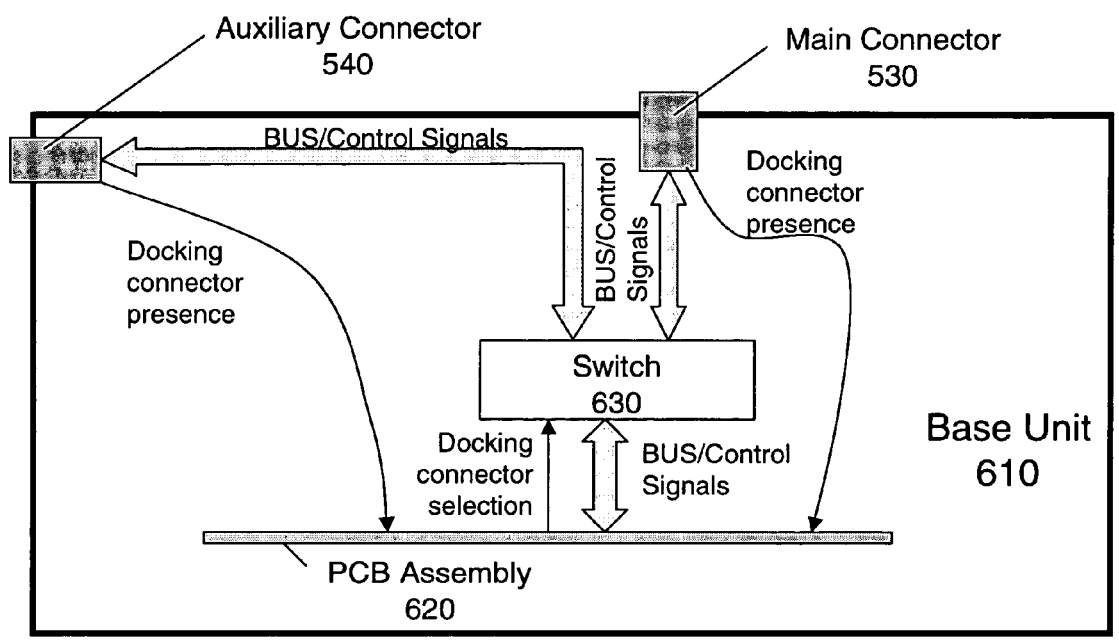
FIG. 6 is an embodiment of a tablet notebook computer having an electrical circuit to detect and control the bus and control signals routing in the base unit.

The auxiliary connector 540 and the main connector 530 do not have to be active at the same time since the main connector 530 provides an electrical contact to the tablet screen 520 in the tilt mode and the auxiliary connector 540 provides an electrical contact to the tablet screen in the convertible mode. FIG. 6 depicts one embodiment of a base unit 610 that comprises a circuit for enabling the main connector 530 and the auxiliary connector 540.

The base unit 610 comprises a main connector 530, an auxiliary connector 540, a PCB assembly 620, and a switch 630. The PCB assembly 620 is coupled to the switch 630. The switch 630 is coupled to the main connector 530 and the auxiliary connector 540.

The PCB assembly 620 transmits data and control signals to the switch 630 via a bus. The PCB assembly 620 also provides a docking connector selection signal to the switch 630. The docking connector selection signal enables either the connection between the switch 630 and the main connector 530 or the connection between the switch 630 and the auxiliary connector 540.

If the tablet notebook computer is in the tilt mode, the PCB assembly 620 will detect a docking connector presence at main connector 530. Thus, the PCB assembly 620 will enable the bus between the switch 630 and the main connector 530. As a result, data and control signals will be transmitted from the PCB assembly 620 to the main connector 530.

On the other hand, if the tablet notebook computer is in the convertible mode, the PCB assembly 620 will detect a docking connector presence at auxiliary connector 540. The PCB assembly will then enable the bus between the switch 630 and the auxiliary connector 540. As a result, data and control signals will be transmitted from the PCB assembly 620 to the auxiliary connector 540.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A tablet notebook computer, comprising:
   a tablet screen;
   a base unit coupled to the tablet screen, wherein the base unit includes
      a first connector,
      a second connector, wherein the second connector
         provides an electrical contact between the tablet screen and the base unit if the tablet screen is placed flat on the base unit in a convertible mode, and a printed circuit board to supply electrical signals to the tablet screen, detect whether there is a docking connector presence at the first and second connectors, and enable a switch to transmit signals to the first connector if the docking connector presence is detected at the first connector; and a docking connector having a friction controlled surface coupled to the base unit, wherein the docking connector includes a slider bar that slides along the friction controlled surface to adjust a tilt angle of the tablet screen, wherein if the tablet screen is coupled to a connector block then the first connector provides an electrical contact between the tablet screen and the base unit.

2. The tablet notebook computer of claim 1, wherein the slider bar is coupled below the friction controlled surface, wherein the friction controlled surface defines a range of travel of the slider bar.

3. The tablet notebook computer of claim 1, wherein the docking connector includes the connector block, wherein the connector block is coupled to the slider bar by a connector attachment plate.

4. The tablet notebook computer of claim 3, wherein a circuit electrically couples the connector block to the printed circuit board assembly.

5. The tablet notebook computer of claim 4, wherein a pivot point is coupled to the connector block to allow the connector block to rotate when the tilt angle of the tablet screen is adjusted.

6. The tablet notebook computer of claim 3, wherein the docking connector comprises a guide pin coupled to the connector block to attach the tablet screen to the connector block.

7. The tablet notebook computer of claim 1, further comprising a tilt support coupled to the tablet screen to support the tablet screen if the tablet screen is tilted at an angle.

8. A method, comprising:

placing a tablet notebook computer in a tilt mode, a tablet mode, or a convertible mode;

attaching a tablet screen of the tablet notebook computer to a docking connector if the tablet notebook computer is in the tilt mode;

providing an electrical contact by an auxiliary connector between the tablet screen and the base unit if the tablet screen is placed flat on the base unit in the convertible mode;

detecting a connector presence;

supplying a first docking connector selection signal to a switch to enable transmission of signals from a printed circuit board assembly to the auxiliary connector; and supplying a second docking connector selection signal to the switch to enable transmission of signals from the printed circuit board assembly to a main connector if the tablet notebook computer is placed in the tilt mode.

9. The method of claim 8, further comprising:

adjusting a slider bar about a friction controlled surface that is coupled to the base unit of the tablet notebook computer to adjust a viewing angle of the tablet screen in the tilt mode.

10. The method of claim 8, further comprising:

providing a tilt support if the tablet notebook computer is in the tilt mode.

\* \* \* \* \*